US012606447B2

(12) United States Patent
Hodgkins et al.

(10) Patent No.: US 12,606,447 B2
(45) Date of Patent: Apr. 21, 2026

(54) MESOPOROUS SILICA MANUFACTURED IN THE PRESENCE OF WATER-SOLUBLE ODSO

(71) Applicant: Saudi Arabian Oil Company, Dhahran (SA)

(72) Inventors: Robert Peter Hodgkins, Dhahran (SA); Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 468 days.

(21) Appl. No.: 18/318,796

(22) Filed: May 17, 2023

(65) Prior Publication Data

US 2023/0286815 A1 Sep. 14, 2023

Related U.S. Application Data

(63) Continuation-in-part of application No. 17/347,125, filed on Jun. 14, 2021, now Pat. No. 11,685,663.

(51) Int. Cl.
*C01B 33/193* (2006.01)

(52) U.S. Cl.
CPC ........ *C01B 33/193* (2013.01); *C01P 2002/72* (2013.01); *C01P 2006/16* (2013.01)

(58) Field of Classification Search
CPC .... C01B 33/193; C01B 33/128; C01B 33/148
See application file for complete search history.

(56) References Cited

U.S. PATENT DOCUMENTS

| | | | |
|---|---|---|---|
| 3,556,725 | A | 1/1971 | Chiola et al. |
| 5,951,962 | A | 9/1999 | Muller et al. |
| 6,814,950 | B1 | 11/2004 | Shan et al. |
| 10,781,168 | B2 | 9/2020 | Koseoglu et al. |
| 10,793,782 | B2 | 10/2020 | Koseoglu et al. |
| 10,807,947 | B2 | 10/2020 | Koseoglu et al. |
| 10,927,318 | B2 | 2/2021 | Koseoglu et al. |

FOREIGN PATENT DOCUMENTS

| | | | |
|---|---|---|---|
| CN | 102452663 | B | 5/2014 |
| CN | 103055933 | B | 8/2015 |
| CN | 106145134 | B | 3/2018 |
| CN | 107982540 | A | 5/2018 |
| CN | 109145134 | A | 1/2019 |
| EP | 0999183 | B1 | 10/1999 |
| EP | 1214272 | B1 | 10/2010 |
| JP | 4176282 | B2 | 8/2005 |

(Continued)

OTHER PUBLICATIONS

Beck et al. "A new family of mesoporous molecular sieves prepared with liquid crystal templates", J. Am. Chem. Soc., 1992, 114, 10834-10843. [10 pages].

(Continued)

*Primary Examiner* — James A Fiorito
(74) *Attorney, Agent, or Firm* — Leason Ellis LLP

(57) ABSTRACT

Mesoporous silica is disclosed possessing a two-dimensional, hexagonal, through-hole structure with a space group p6mm, that is formed using one or more water-soluble oxidized disulfide oil (ODSO) compounds during the synthesis to impart distinct characteristics including an increased percentage of silanol groups.

18 Claims, 5 Drawing Sheets

(56) References Cited

FOREIGN PATENT DOCUMENTS

| | | | | | |
|---|---|---|---|---|---|
| WO | 2018202468 | A1 | | 11/2018 | |
| WO | WO-2018234100 | A1 | * | 12/2018 | ............ C01B 37/02 |

OTHER PUBLICATIONS

Kresge et al. “Ordered mesoporous molecular sieves synthesized by a liquid-crystal template mechanism”, Nature, 1992, 359, 710-712. [3 pages].

Zhao et al. “Nonionic Triblock and Star Diblock Copolymer and Oligomeric Surfactant Syntheses of Highly Ordered, Hydrothermally Stable, Mesoporous Silica Structures”, J. Am. Chem. Soc., 1998, 120, 6024-6036. [13 pages].

Office Action in corresponding Saudi Arabian Application No. 123447263 dated Oct. 27, 2024; 15 pages.

Grabicka et al. “Microwave-assisted synthesis of periodic mesoporous organosilicas with ethane and dlisulfide groups.” Microporous and Mesoporous Materials, vol. 119, Issues 1-3, 2009, pp. 144-149.

Jin et al. “Gold nanoparticles stabilized in a novel periodic mesoporous organosilica of SBA-15 for styrene epoxidation.” Microporous and Mesoporous Materials, vol. 111, Issues 1-3, 2008, pp. 569-576.

Office Action in corresponding Saudi Arabian Application No. 123447263 dated Jul. 27, 2024; 13 pages.

* cited by examiner

Conventional SBA-15

MS-ODSO

MESOPOROUS SILICA MANUFACTURED IN THE PRESENCE OF WATER-SOLUBLE ODSO

RELATED APPLICATIONS

This application is a continuation-in-part of U.S. patent application Ser. No. 17/347,125 filed Jun. 14, 2021, the contents of which are is incorporated herein by reference.

BACKGROUND OF THE INVENTION

Field of the Invention

The present invention relates to mesoporous silica.

Description of Related Art

Zeolites are microporous aluminosilicate materials (pores typically up to 2 nm) that are heavily used in industry as catalysts or catalyst base materials (catalytic cracking of hydrocarbons and as components in catalytic convertors), adsorbents (drying agents) and ion exchange materials (water softening). Whereas zeolites have found great utility in their ability to select between small molecules and different cations, mesoporous solids (pores between 2 nm and 50 nm) offer possibilities for applications for species up to an order of magnitude larger in dimensions such as nanoparticles and enzymes. The comparatively bulky nature of such species hinders diffusion through the microporous zeolite network, and thus, a larger porous system is required to effectively perform an analogous molecular sieving action for the larger species.

The field of mesoporous materials primarily stems from zeolite research undertaken during the 1990s when researchers were pursuing large pore zeolite analogues for heavy hydrocarbon conversion (Ordered mesoporous molecular sieves synthesized by a liquid-crystal template mechanism. C. T. Kresge, M. E. Leonowicz, W. J. Roth, J. C. Vartuli and J. S. Beck, Nature, 1992,359,710; A new family of mesoporous molecular sieves prepared with liquid crystal templates, J. S. Beck, J. C. Vartuli, W. J. Roth, M. E. Leonowicz, C. T. Kresge, K. D. Schmitt, C. T. W. Chu, D. H. Olson, E. W. Sheppard, S. B. McCullen, J. B. Higgins and J. L. Schlenker, J. Am. Chem. Soc., 1992, 114, 10834). Since numerous synthetic architectures were crystallized around structure directing agents or templates, which, upon removal, renders the material porous, the rationale was that larger templates or aggregations of molecules could act as a mold. Mesoporous silica was realized in 1992, with MCM-41 (Mobil Composition of Matter) templated using amphiphilic surfactant aggregations in a sol-gel synthesis, namely using CTAB (cetyltrimethylammonium bromide).

Mesoporous silicas are amorphous; however, it is the pores that possess long-range order with a periodically aligned pore structure and uniform pore sizes on the mesoscale. Mesoporous silicas offer high surface areas and can be used as host materials to introduce additional functionality for a diverse range of applications such as adsorption, separation, catalysis, drug delivery and energy conversion and storage.

"Soft" templates can be used for the synthesis of mesoporous silica, for example CTAB and amphiphilic block copolymers. A common reagent for the latter block copolymer is Pluronic P123 (BASF). The SBA-series (Santa Barbara) of mesoporous silicas (Dongyuan Zhao, Qisheng Huo, Jianglin Feng, Bradley F Chmelka, Galen D Stucky, J. Am. Chem. Soc., 1998, 120, 6024) further opened the field of mesoporous silicas with larger pores by utilizing such block copolymer templates in the syntheses of mesoporous silicas. This "soft" templating approach allows for the mesopore structure, shape and pore size to be designed through controlling the synthesis conditions and the nature of the template used. Pluronic P123 used for production of SBA-15 mesoporous silica is a triblock copolymer of ethylene oxide/propylene oxide/ethylene oxide having the composition ($EO_{20}PO_{70}EO_{20}$).

Surfactants, used as the templates for mesoporous silicas, and deemed amphiphilic molecules, possess a hydrophilic head group and a hydrophobic tail, and can be classified into various types depending on their constituent groups:

i) cationic whereby the hydrophobic head groups are amine/quaternary ammonium cations as in CTAB,
ii) anionic constituting for example carboxylic head groups,
iii) non-ionic having polyether/polyhydroxyl polar groups, or
iv) zwitterionic containing two charged head groups of opposite charge. The hydrophobic section tends to be long alkyl chains.

At low concentrations surfactants exist as discrete entities. However, at higher concentrations, that is, above the critical micelle concentration (CMC), micelles are formed. The hydrophobic interactions in the system comprising the surfactant can alter the packing shape of the surfactants into spherical, prolate or cylindrical micelles, which can thereafter form thermodynamically stable two dimensional or three dimensional liquid crystalline phases of ordered mesostructures. The surfactant geometry influences the mesophase formed, from cubic to lamellar.

The sol-gel route is typically used to synthesize SBA-15 and involves a two-step process: a hydrolysis step followed by a condensation step.

$$\text{Hydrolysis: } Si(OR)_4+H_2O\rightarrow HO—Si(OR)_3+ROH \quad (1)$$

$$\text{Condensation: } 2(OR)_3SiOH\rightarrow(OR)_3Si—O—Si(OH)_3+H_2O \quad (2)$$

where R is an alkyl.

Mesoporous silica can be functionalized by post-synthetic grafting of, for example organosiloxanes. First the mesoporous silica need to be rendered porous by removing the surfactant from the pores. This is typically done by calcining the material to leave the porous inorganic silica framework. However, calcining mesoporous silica further condenses the framework to form additional siloxane bridges (a higher degree of $Q^4$ silica). Post synthetic modification by organosiloxane grafting can only occur where there are silanol groups as these act as anchors for the organosiloxane, thus $Q^3$, $Q^2$, $Q^1$ or $Q^0$ silica must be present as $Q^4$ silica are fully condensed to form a rigid framework. Since calcination condenses the framework there is a decreased volume of silanol groups available for organic modification silylation and so that silanol groups have to be replenished if a high surface coverage of functional groups is required. This can be achieved by rehydrating the surface.

Within a typical refinery, there are by-product streams that must be processed in other process units or otherwise disposed of. The mercaptan oxidation process, commonly referred to as the MEROX process, has long been employed for the removal of the generally foul smelling mercaptans found in many hydrocarbon streams and was introduced in the refining industry over fifty years ago. Because of regulatory requirements for the reduction of the sulfur content of fuels for environmental reasons, refineries have been, and continue to be faced with the disposal of large volumes of sulfur-containing by-products. Disulfide oil (DSO) compounds are produced as a by-product of mercaptan oxidation processes, known as a MEROX process, in which the mercaptans are removed from any of a variety of petroleum streams including liquefied petroleum gas, naphtha, and other hydrocarbon fractions. It is commonly referred to as a 'sweetening process' because it removes the sour or foul smelling mercaptans present in crude petroleum. The term "DSO" is used for convenience in this description and in the claims, and will be understood to include the mixture of disulfide oils produced as by-products of the mercaptan oxidation process. Examples of DSO include dimethyldisulfide, diethyldisulfide, and methylethyldisulfide.

The by-product DSO compounds produced by the MEROX unit can be processed and/or disposed of during the operation of various other refinery units. For example, DSO can be added to the fuel oil pool at the expense of a resulting higher sulfur content of the pool. DSO can be processed in a hydrotreating/hydrocracking unit at the expense of higher hydrogen consumption. DSO also has an unpleasant foul or sour smell. Therefore, it is known that problems exist in the handling of DSO.

Commonly owned U.S. Pat. No. 10,807,947 which is incorporated by reference herein in its entirety discloses a controlled catalytic oxidation of MEROX process by-products DSO. The resulting oxidized material is referred to as oxidized disulfide oil (ODSO). As disclosed in 10,807,947, the by-product DSO compounds from the mercaptan oxidation process can be oxidized, preferably in the presence of a catalyst. The oxidation reaction products constitute an abundant source of ODSO compounds, sulfoxides, sulfonates, sulfinates and sulfones. The oxidant can be a liquid peroxide selected from the group consisting of alkyl hydroperoxides, aryl hydroperoxides, dialkyl peroxides, diaryl peroxides, peresters and hydrogen peroxide. The oxidant can also be a gas, including air, oxygen, ozone and oxides of nitrogen. The catalyst can be a homogeneous compound that is a transition metal containing an active species selected from the group consisting of Mo (VI), W (VI), V (V), Ti (IV), and combinations thereof.

ODSO compounds are disclosed in U.S. Pat. No. 10,781,168 as a solvent (in general), in U.S. Pat. No. 10,793,782 as an aromatics extraction solvent, and in U.S. Pat. No. 10,927,318 as a lubricity additive, all of which are incorporated by reference herein in their entireties. In the event that a refiner has produced or has on hand an amount of DSO compounds that is in excess of foreseeable needs for these or other uses, the refiner may wish to dispose of the DSO compounds in order to clear a storage vessel and/or eliminate the product from inventory for tax reasons.

Thus, there is a clear and long-standing need to provide an efficient and economical process for the treatment of the large volumes of DSO by-products and their derivatives to effect and modify their properties in order to facilitate and simplify their environmentally acceptable disposal, and to utilize the modified products in an economically and environmentally friendly manner, and thereby enhance the value of this class of by-products to the refiner.

Despite the known methods that exist for manufacturing SBA-15 mesoporous silica, there remains a need in the art for improved methods to produce SBA-15 mesoporous silica and modified mesoporous silica materials.

SUMMARY

Methods of synthesis of mesoporous silica are disclosed. The mesoporous silica synthesized herein, like SBA-15, possesses a two-dimensional, hexagonal, through-hole structure with a space group p6mm.

In one embodiment, the method comprises mixing in an aqueous medium under conditions conducive to promote hydrolysis reactions effective quantities of a surfactant as a soft template material to influence a silica mesoporous structure, one or more water-soluble ODSO compounds as an acidity modifier, and a silica source. The mixture is then heated under conditions and for a time effective conducive to promote condensation reactions and to form mesoporous silica as a precipitate suspended in a supernatant as an intermediate suspension. The mesoporous silica is recovered from the intermediate suspension. In certain embodiments the recovered mesoporous silica is treated to remove the surfactant, for example, by thermal treatment to realize the calcined mesoporous silica material.

In another embodiment, the method comprises mixing in an aqueous medium effective quantities of one or more water-soluble ODSO compounds as an acidity modifier and a surfactant as a soft template material to influence a silica mesoporous structure to form a first mixture; mixing an effective quantity of a silica source with the first mixture under conditions conducive to promote hydrolysis reactions and form a second mixture; heating the second mixture under conditions and for a time effective conducive to promote condensation reactions and to form mesoporous silica as a precipitate suspended in a supernatant as an intermediate suspension, and recovering the mesoporous silica from the intermediate suspension. In certain embodiments the recovered mesoporous silica is treated to remove the surfactant, for example, by thermal treatment to realize the calcined mesoporous silica material.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The invention will be described in further detail below and with reference to the attached drawings in which the same or similar elements are referred to by the same number, and where.

DETAILED DESCRIPTION

Figure 1A:
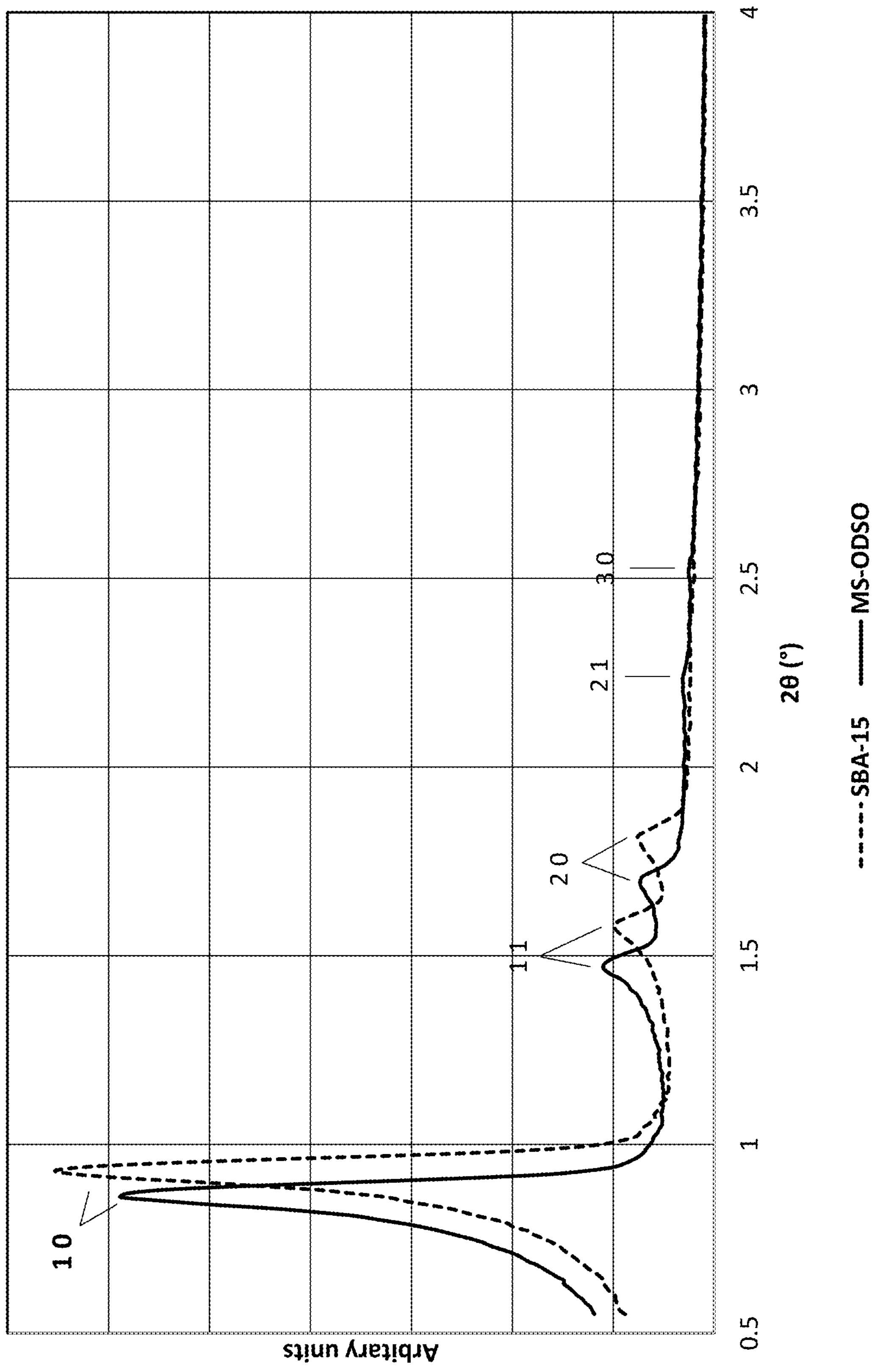
FIG. 1A shows X-ray diffraction patterns of conventional SBA-15 and mesoporous silica synthesized in the presence of ODSO (MS-ODSO)

Described herein are methods of manufacture of mesoporous silica having hexagonal p6mm symmetry, similar to SBA-15 mesoporous silicas, and are useful as a catalysts or catalyst base materials. An effective quantity of one or more water-soluble ODSO compounds are used during synthesis, as described herein, to impart distinct characteristics. The process herein uses the ODSO as a substitute for, or in combination with, an acid that is conventionally used in the production of SBA-15 mesoporous silica, such as hydrochloric acid. As used herein, the as-produced mesoporous silica is sometimes referred to as "MS-ODSO." It is understood that this notation shall be applicable for the so-produced mesoporous silica in its condition prior to treatment to remove the surfactant, such as thermal treatment or solvent extraction, or in its treated state.

A sol-gel synthesis method comprises mixing, in an aqueous medium, a silica source, a surfactant, and an effective amount of one or more ODSO compounds, wherein the ODSO can be used as a replacement for another acid or in combination therewith. The mixture is heated under conditions and for a time effective to form the mesoporous silica as thermodynamically stable two dimensional or three dimensional liquid crystalline phases of ordered mesostructures, as a precipitate suspended in a supernatant. The mesoporous silica is recovered from this intermediate suspension of the precipitate in the supernatant, for example by filtration, washing and drying.

A porous material is obtained by treating recovered precipitate to remove the surfactant, for example by thermal treatment and/or solvent extraction. For example, thermal treatment can include calcination at a suitable temperature, temperature ramp rate and for a suitable period of time at to realize MS-ODSO. Alternatively, a solvent with a Hildebrand solubility factor more than 18, including but not limited to ethanol (Hildebrand solubility factor of 26.2), can be used in a solvent extraction process, which is effective to remove the surfactant and any remaining content from the TEMs. In certain embodiments, a solvent extraction process is suitable to realize an increase in silanol groups when compared with calcination.

In the process herein, one or more water-soluble ODSO compounds are used in the synthesis of mesoporous silica, including those that contain three or more oxygen atoms, to facilitate synthesis using water as the medium. The one or more ODSO compounds can include compounds of the general formulae R—SOO—SO—R', R—SOO—SOO—R', R—SO—SOO—OH, R—SOO—SOO—OH, R—SO—SO—OH, R—SOO—SO—OH, and mixtures thereof, where R and R' can be the same or different and are alkyl groups comprising 1-10 carbon atoms. In certain embodiments, the R and R' are methyl and/or ethyl groups. The one or more ODSO compounds used in the synthesis of MS-ODSO generally include ODSO compounds having 3 or more oxygen atoms. In certain embodiments, one or more ODSO compounds used in the synthesis of MS-ODSO include ODSO compounds having 1 to 20 carbon atoms. In certain embodiments, one or more ODSO compounds used in the synthesis of MS-ODSO include ODSO compounds having an average density greater than about 1.0 g/cc. In certain embodiments, one or more ODSO compounds used in the synthesis of MS-ODSO include ODSO compounds having an average boiling point greater than about 80° C.

In certain embodiments ODSO compounds used in the synthesis of MS-ODSO comprise all or a portion of water-soluble ODSO compounds contained in an oxidation effluent stream that is obtained by oxidation of DSO compounds from a MEROX process, as disclosed in U.S. Pat. Nos. 10,807,947 and 10,781,168 and as incorporated herein by reference above. Table 1 identifies certain water-soluble ODSO compounds that are formed by oxidation of DSO obtained from MEROX by-products.

TABLE 1

| ODSO Name | Formula | Structure Examples |
|---|---|---|
| Dialkyl-sulfonesulfoxide Or 1,2-alkyl-alkyl-disulfane 1,1,2-trioxide | (R-SOO-SO-R') | 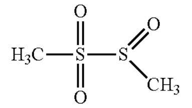<br>1,2-Dimethyldisulfane 1,1,2-trioxide |
| Dialkyl-disulfone Or 1,2 alkyl-alkyl-disulfane 1,1,2,2-tetraoxide | (R-SOO-SOO-R') | 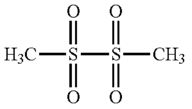<br>1,2-Dimethyldisulfane 1,1,2,2-tetraoxide |
| Alkyl-sulfoxidesulfonate | (R-SO-SOO-OH) | 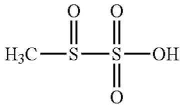<br>Methylsulfanesulfonic acid oxide |
| Alkyl-sulfonesulfonate | (R-SOO-SOO-OH) | 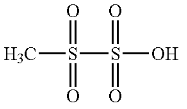<br>1-Hydroxy-2-methyldisulfane 1,1,2,2-tetraoxide |
| Alkyl-sulfoxidesulfinate | (R-SO-SO-OH) | 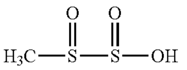<br>1-Hydroxy-2-methyldisulfane 1,2-dioxide |
| Alkyl-sulfonesulfinate | (R-SOO-SO-OH) | 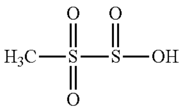<br>Methylsulfanesulfinic acid dioxide |

R and R' can be the same or different alkyl groups comprising 1-10 carbon atoms.

In certain embodiments, the ODSO compounds are contained in a mixture from oxidation of DSO compounds, comprising alkyl-sulfoxidesulfonate (R—SO—SOO—OH), alkyl-sulfonesulfonate (R—SOO—SOO—OH), alkyl-sulfoxidesulfinate (R—SO—SO—OH) and alkyl-sulfonesulfinate (R—SOO—SO—OH), for example, similar to those obtained as "Composition 2" in U.S. Pat. No. 10,781,168 as incorporated herein by reference above.

In the present process, one or more ODSO compounds are used in the SBA-15 sol-gel synthesis process to alter the properties of the as-produced mesoporous silica. By forming the mesoporous silica in the presence of ODSO, the properties of the resulting MS-ODSO are different than those of SBA-15 prepared using conventional synthesis processes that occur in the absence of such ODSO. The properties of the conventional SBA-15 and the MS-ODSO were characterized (as explained in more detail below) after the hydrolysis and condensation reactions and prior to calcining (the "uncalcined" or "as-made" material), and after calcining (the "calcined" material). As compared to conventional SBA-15 mesoporous silica, and as explained in the exampled herein, the MS-ODSO material exhibits:

- worm-like morphology;
- increased unit cell dimensions in the as-made and calcined MS-ODSO;
- a higher degree of long-range ordering-in the as-made and calcined MS-ODSO;
- a higher degree of silanol (Si—OH) formation in the uncalcined MS-ODSO due to a higher quantity of $Q^2+Q^3$ silica;
- a lower degree of $Q^2$ silica in the uncalcined material;
- a higher degree of siloxane bridges (Si—O—Si) due to a higher quantity of $Q^3+Q^4$ silica in the uncalcined material, and hence increased stability/rigidity of the mesoporous silica framework;
- a lower degree of $Q^4$ silica in the calcined material, for instance where the MS-ODSO has in the range of about 0.1-50, 5-50, 0.1-35 or 5-35% less $Q^4$ silica as compared to conventional SBA-15; and
- an increased percentage of silanol groups, which is a function of the $Q^2+Q^3$ silica, in the calcined material, for instance where the MS-ODSO has in the range of about 0.1-65 or 25-65% more silanol groups as compared to conventional SBA-15.

The lower degree of $Q^4$ silica and the higher degree of $Q^2$ and $Q^3$ silica in the calcined material, as quantified by NMR spectroscopy, results in an increase in silanol (Si—OH) groups. Silanol groups in mesoporous silica arm commonly used to provide a site to graft additional functionality to the surface of the material post-synthesis. For example, function siloxanes groups X—$Si(OCH_3)_3$ can be used to:

i) alter the surface properties of the material, for example by making the surface more hydrophobic or hydrophilic, or ii) uptake additional functionality to create advanced functional materials, for example, uptake of magnetic nanoparticles for improved medical imaging such as magnetic resonance imaging, graft catalytic complexes for catalysis, immobilization of enzymes, and uptake of active pharmaceutical ingredients for controlled release of drugs.

At low concentrations surfactants exist as discrete entities, however, at higher concentrations (above the CMC) micelles are formed. The hydrophobic interactions in the system comprising the surfactant can alter the packing shape of the surfactants into spherical, prolate or cylindrical micelles, which can thereafter form thermodynamically stable two dimensional or three dimensional liquid crystalline phases of ordered mesostructures. The surfactant geometry influences mesophase formed, from cubic to lamellar; the geometry of the conventional SBA-15 and the MS-ODSO are both hexagonal p6mm symmetry.

Aside from the addition of ODSO described herein, the sol-gel synthesis is similar to known processes, for example as mentioned in the background and described with respect to formulae (1) and (2). In general, a sol-gel synthesis process to realize mesoporous silica as described herein starts with a colloidal aqueous solution of a (i) silica source, (ii) an acid medium, and (iii) a surfactant as a soft template material to influence a silica mesoporous structure. In the conventional SBA-15 synthesis processes, the acid medium is a separate acid; in the process herein, the acidity of the acid medium is attached by the ODSO compounds, directly and/or based on hydrolysis in the water medium to form acids.

Surfactants used as the templates for large pore mesoporous silicas are copolymers, block copolymers or triblock copolymers, and are generally amphiphilic molecules. The amphiphilic molecules can be cationic, anionic, nonionic and/or zwitterionic. In certain embodiments an effective surfactant comprises a non-ionic surfactant. In certain embodiments an effective surfactant comprises a triblock copolymer of ethylene oxide/propylene oxide/ethylene oxide. For example, a suitable triblock copolymer of ethylene oxide/propylene oxide/ethylene oxide has the general composition $EO_{20}PO_{70}EO_{20}$, and is commercially available under the tradename Pluronic P123 (BASF), and is useful for the synthesis of SBA-15.

The mesoporous silica formation including the surfactant is acid-catalyzed, for example to realize a pH level less than about 3, 2 or 1. In conventional SBA-15 synthesis, this is by the addition of an effective amount of hydrochloric acid (HCl), sulfuric acid ($H_2SO_4$), hydrobromic acid (HBr), phosphoric acid ($H_3PO_4$) or nitric acid ($HNO_3$); typically in reported SBA-15 synthesis methods the acid is HCl. In the process herein to produce MS-ODSO, all or a portion of the requisite acidity is contributed by the ODSO. For example, a conventional acid source as noted above can be used in an amount that is 0-99, 0-50, 0-25, 5-99, 5-50 or 5-25 molar % of the amount required to attain a pH in a range of about 1-3 in the absence of ODSO. In certain embodiments, the only acidity modifier is the ODSO.

The silica source can comprise one or more of tetraethyl orthosilicate (TEOS), tetramethyl orthosilicate (TMOS), tetrapropyl orthosilicate (TPOS), tetrabutyl orthosilicate (TBOS) or sodium (meta)silicate.

In the process herein, the ratios of silica source the surfactant and water include those that are effective for producing SBA-15 mesoporous silica, including for example surfactant in the range of about 1-5, 1-3, 2-5, 2-3 or about 2.5 wt % of the total sol-gel composition. As noted herein, the acidity modifier, which is ODSO alone or in combination with another acid source, is added at an effective quantity to attain a pH level of less than or equal to about 3, 2 or 1.

In the synthesis steps for producing MS-ODSO, the sequence of adding the components is described above, but can be varied. In certain embodiments, the surfactant, water and the acidity modifier (ODSO alone or in combination with another acid) are formed into a solution, to which the silica is then added. In other embodiments, the ODSO can be added with the silica source.

Suitable conditions for the mixing steps described herein to produce the aqueous mixture of silica, surfactant and ODSO (and optionally another acidity modifier) are similar to those used in conventional SBA-15 synthesis, and can be, for instance, in the range of about 20-65 or 20-50° C., and at atmospheric pressure. The mixing time before silica addition is generally dependent on the time that it takes for the surfactant and the ODSO to dissolve, and thereafter the silica is added and mixed until fully dissolved and in certain embodiments mixed for an additional 0-24 or 0-4 hours after it is fully dissolved.

The hydrolysis reactions occur at temperature and pressure conditions similar to those used in conventional SBA-15 synthesis, for instance about 20-65 or 35-65° C. and at atmospheric or autogenous pressure, and for a time period of about 10 minutes to 24 hours or 4-24 hours. Also, condensation reactions occur at temperature and pressure conditions similar to those used in conventional SBA-15 synthesis, for instance about 80-120, 90-120, 80-110 or 90-110° C. and at atmospheric or autogenous pressure, and for a time period of about 1-4 or 1-2.5 days.

The temperature and pressure conditions, and residence time, for the washing and filtration steps to recover precipitate from the supernatant that is used for producing SBA-15 mesoporous silicas and the novel mesoporous silicas herein are in the range of about: 20-80° C., at atmospheric pressure or vacuum pressure (for instance, up to about 33, 135 or 160 millibars absolute), and can occur until the pH of the filtrate approaches 7. The wash can be, for example, using wash water at twice the volume of the sol-gel. The wash can be until foam (residual surfactant) is significantly reduced. Filtration is accomplished, for instance, using known techniques such as centrifugation, gravity, vacuum filtration, filter press, or rotary drums.

The temperature and time for calcination to produce MS-ODSO herein can be in the range of about: 215-600 or 450-600° C., for about 4-24, 4-16, 8-24 or 8-16 hours, and a ramp rate of about 1-10 or 1-5° C. per minute.

EXAMPLES

Comparative Example 1.59 g of Pluronic P123 ($mw_{av}$ 5750) was dissolved in 55.24 g water and 5.16 g HCl (37 wt. %) at 40° C. Once dissolved 3.3 g tetraethyl orthosilicate (99 wt. %) was added to the solution and the system was further stirred at 40° C. for 24 hours for the hydrolysis reaction to proceed. The molar ratio of these components can be expressed as:

$$1SiO_2:0.018P123:3.3HCl:208H_2O.$$

The mixture was transferred to a Teflon-lined autoclave and the system isolated. The mixture was subjected to a temperature of 100° C. for 48 hours for the condensation reaction to proceed. After the desired time the autoclave was cooled and the product filtered under vacuum before washing with water. The resulting powder was dried at 100° C. to yield the as-made product. The as-made product was calcined at 550° C. (1° C./min) for 8 hours to yield the calcined SBA-15 mesoporous silica material.

Example 1.59 g of Pluronic P123 ($mw_{av}$ 5750) was dissolved in 55.24 g water and 5.16 g water-soluble ODSO at 40° C. The ODSO used in this example are those obtained as "Composition 2" in U.S. Pat. No. 10,781,168, incorporated herein by reference above. Once dissolved 3.3 g tetraethyl orthosilicate (99 wt. %) was added to the solution and stirring was continued at 40° C. for 24 hours for the hydrolysis reaction to proceed. The molar ratio of these components, including ODSO* instead of HCl as in the comparative example, can be expressed as:

$$1SiO_2:0.018P123:2.2ODSO:196H_2O.$$

*Based on the data in the referenced U.S. Pat. No. 10,781,168, an average molecular weight of 151.2 can be assumed, for a molar composition of 2.2, relative to the other components as shown.

Thereafter, the mixture was transferred to a Teflon-lined autoclave and the system isolated. The mixture was subjected to a temperature of 100° C. for 48 hours for the condensation reaction to proceed. After the desired time the autoclave was cooled and the product filtered under vacuum before washing with water. The resulting powder was dried at 100° C. to yield the as-made MS-ODSO material (also referred to herein as the uncalcined MS-ODSO material). The as-made material was calcined at 550° C. (1° C./min) for 8 hours to yield the calcined MS-ODSO material.

Figure 1B:
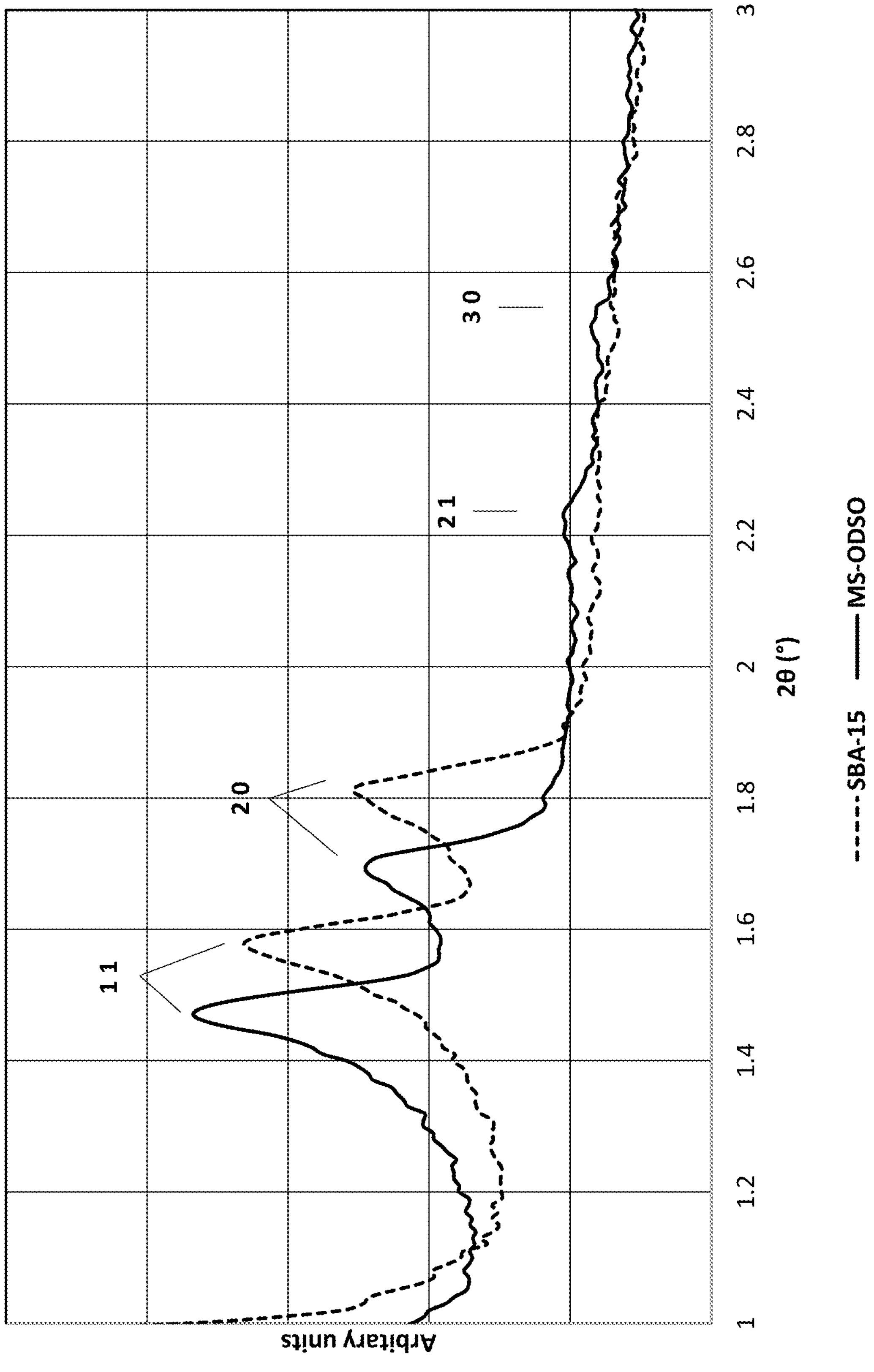
FIG. 1B is an enlarged section of the patters shown in FIG. 1.

FIG. 1A shows X-ray diffraction patterns of the calcined SBA-15 mesoporous silica material of the comparative example and the MS-ODSO material of the Example synthesized in the presence of ODSO. FIG. 1B shows an enlarged section of the graph of FIG. 1A between the 2θ angles 1° and 3°. X-ray diffraction is carried out with an X-ray source of Cu Kα radiation (λ=1.5406 Å) and the graph is presented in a known format of scattering, the 2θ angles, on the x-axis, plotted against intensity, measured in arbitrary units, on the y-axis. From FIG. 1B, it is observed that the long-range order is enhanced in the MS-ODSO compared to conventional SBA-15. The tertiary 2 1 and 3 0 peak reflections are more enhanced in the MS-ODSO as compared to the conventional SBA-15.

Table 2 presents unit cell dimensions of the comparative and the MS-ODSO materials. The MS-ODSO has its diffraction pattern shifted to lower 2θ angles, which is indicative of larger unit cell dimensions.

TABLE 2

| Material | 2θ (°) | Interplanar spacing, $d_{10}$ (Å) | Unit cell, $a_{10}$ (Å)* |
|---|---|---|---|
| SBA-15 | 0.93 | 95 | 110 |
| SBA-15 ODSO | 0.86 | 103 | 119 |

*Hexagonal lattice parameter;
$a = \sqrt{(4/3)}\, d_{10}^2$.

Figure 2:
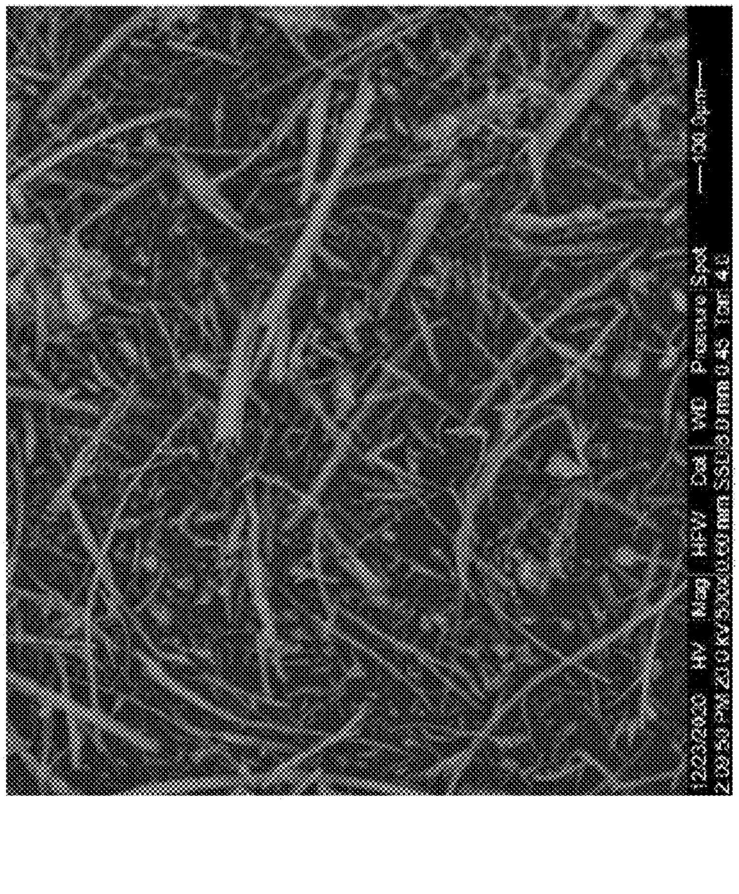
FIG. 2 shows scanning electron microscopy images of conventional SBA-15 and MS-ODSO.
Figure 2:
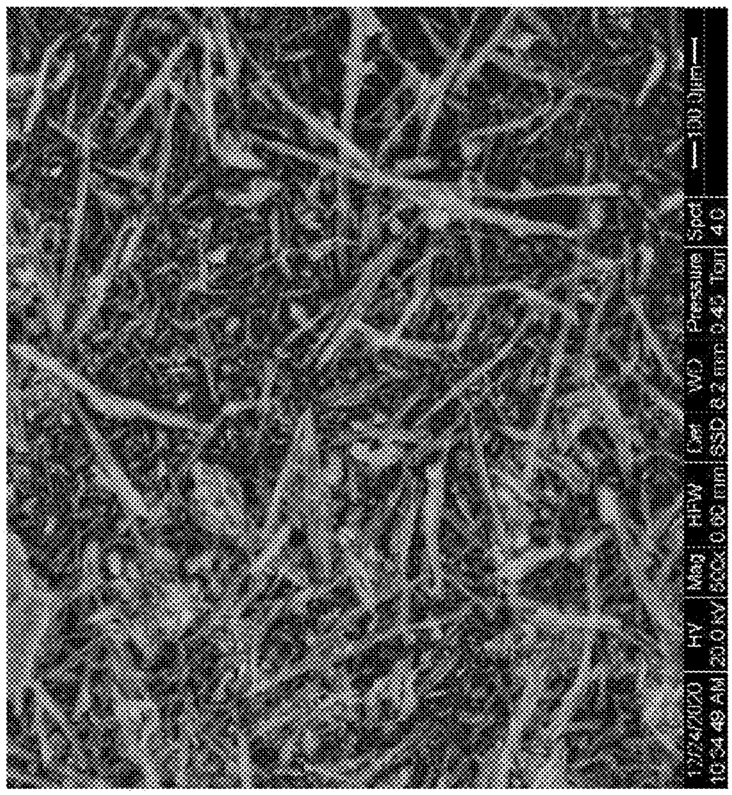

FIG. 2 presents scanning electron micrographs of conventional SBA-15 material and MS-ODSO material. Both show worm-like morphology.

Figure 3:
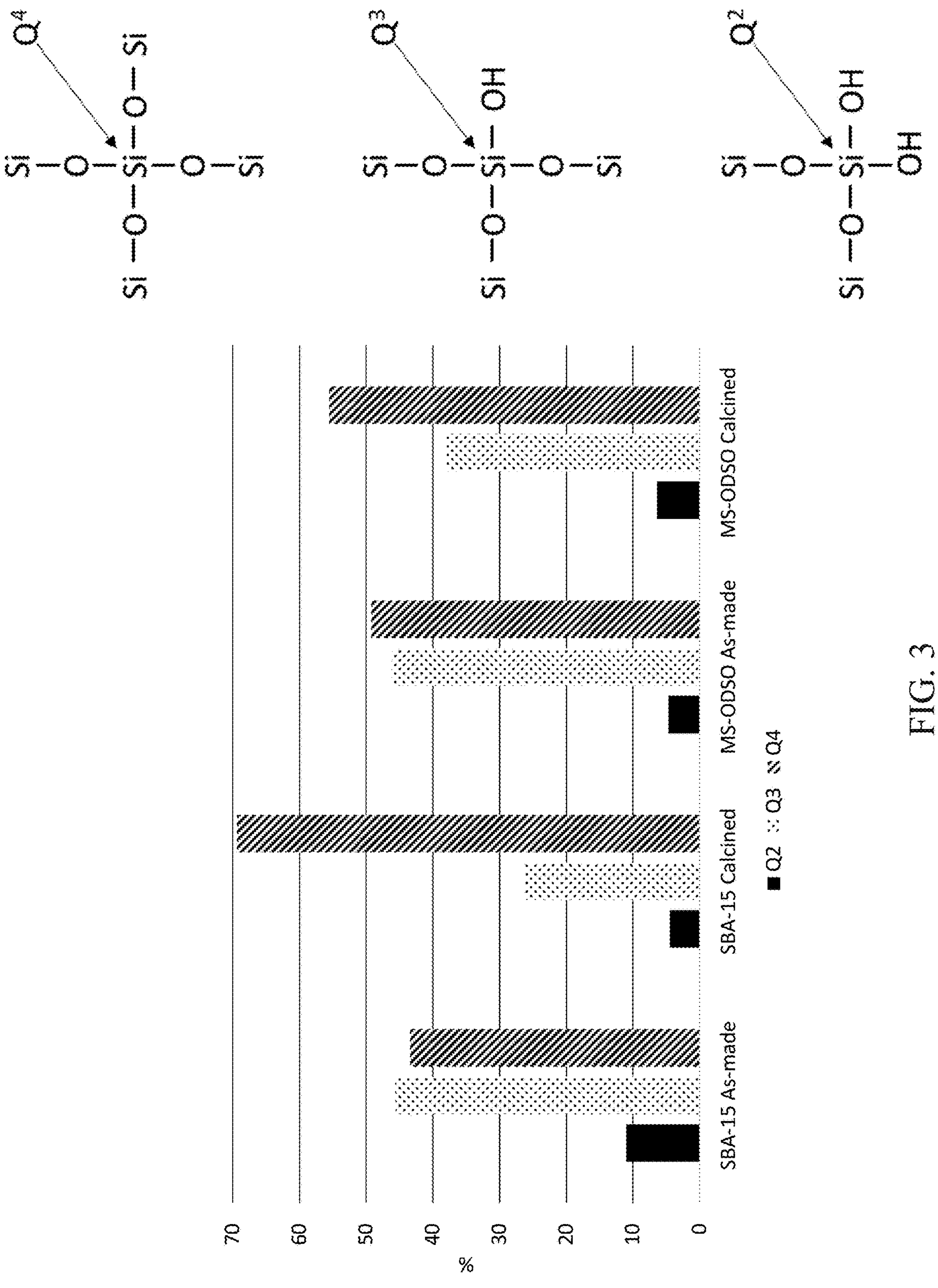
FIG. 3 is a graph of $Q^4$, $Q^3$ and $Q^2$ populations of conventional SBA-15 and MS-ODSO, determined from $^{29}Si$ nuclear magnetic resonance spectroscopy, and associated structural formulae of $Q^4$ siloxanes, $Q^3$ silanols and $Q^2$ silanols.

FIG. 3 shows $^{29}Si$ NMR data and specifically the $Q^4$, $Q^3$ and $Q^2$ populations of conventional SBA-15 mesoporous silica material and MS-ODSO mesoporous silica material synthesized in the presence of ODSO. There are clear differences between the framework composition between the two samples. Samples were packed into 4 mm solid-state NMR sample rotors. Magic angle spinning (MAS) experiments were performed on a Varian 500 MHz NMR spectrometer using a 4 mm HX probe. $^{29}Si$ MAS experiments were performed at a spinning frequency of 10 kHz. The obtained spectra were processed in MestreNova. Line fitting was performed on the spectra for peaks at approximate chemical shifts of −110 ppm ($Q^4$), −100 ppm ($Q^3$) and −90 ppm ($Q^2$). The area under the deconvoluted peaks were used to determine the percentage of $Q^n$ functionality present via the following equation:

$$\%\ Q^n = \text{Area under deconvoluted } Q^n \text{ peak/Area under all deconvoluted peaks} \quad (3)$$

When synthesized in the presence of ODSO, the uncalcined MS-ODSO material exhibits a 57% reduction in the amount of $Q^2$ silica, and an increase in the stability/rigidity of the mesoporous silica material framework due to the increased number of siloxane bridges (Si—O—Si) $Q^3$ and $Q^4$ (up by 7%).

In the calcined MS-ODSO, there is an increase in number of silanol groups which will allow for greater surface coverage of functional groups by silylation, due to a reduction in the $Q^4$ silica (reduced by 20%).

Based on the nitrogen adsorption isotherm data, there is an increase in the BET surface area (based on the known BET (Brunauer, Emmett and Teller theory) for MS-ODSO relative to conventional SBA-15 by about 10% (BET of MS-ODSO=893 $m^2/g$; BET of conventional SBA-15=811 $m^2/g$). The percentage of microporous surface area to the total surface area is increased for MS-ODSO by about 49% (MS-ODSO microporous surface area=153 $m^2/g$; conventional SBA-15 microporous surface area=103 $m^2/g$). The total pore volume increased in the MS-ODSO by about 18% (conventional SBA-15=1.07 cc/g; MS-ODSO=1.26 cc/g). In addition, the pore sizes of the MS-ODSO material increases relative to the conventional SBA-15, from 6.5 nm in the conventional SBA-15 to 7.8 nm in the MS-ODSO, based on the desorption branch of the isotherm and by the BJH model (the known the method of Barrett, Joyner, and Halenda).

Figure 4:
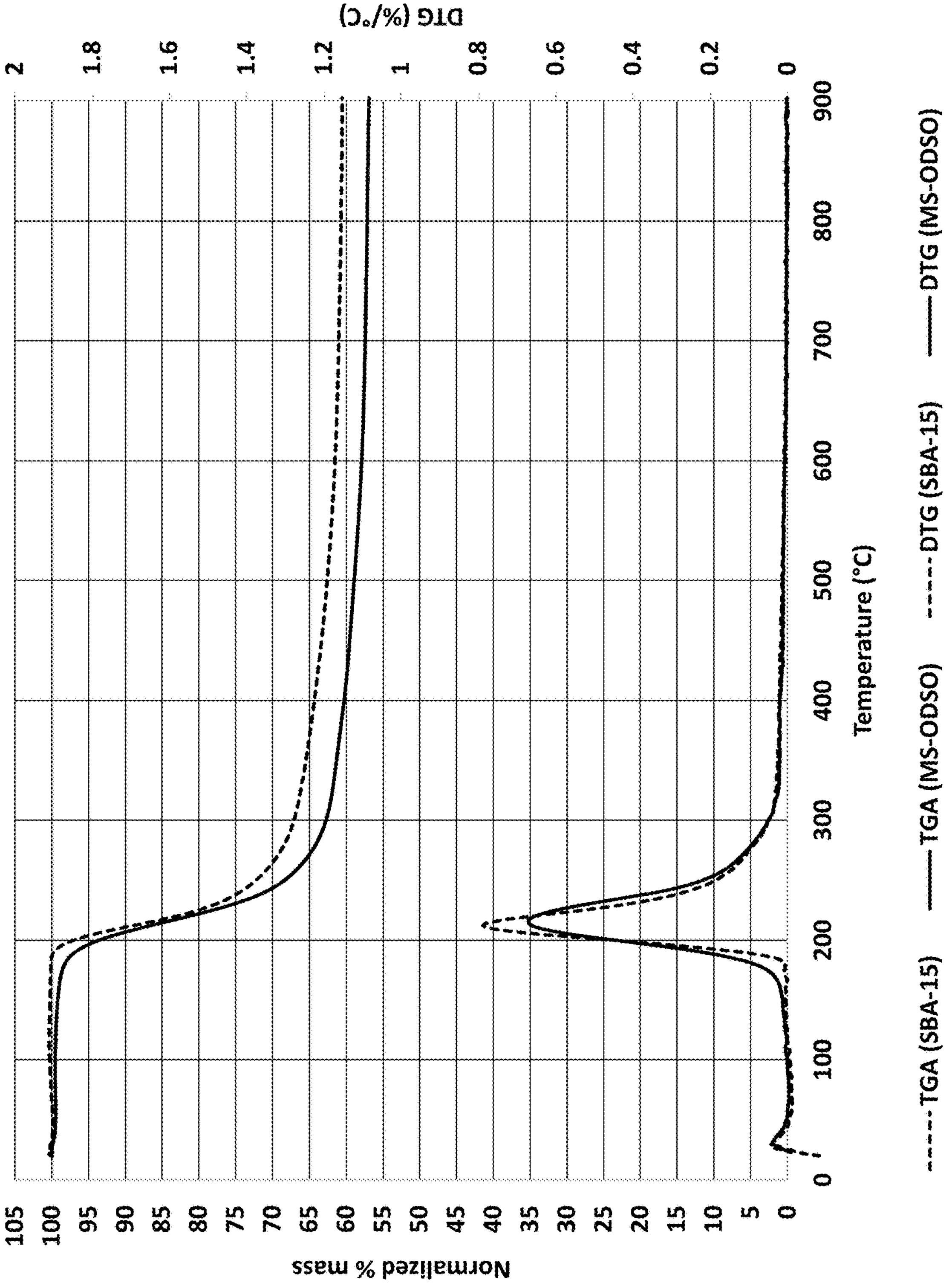
FIG. 4 presents graphs of thermogravimetric and differential thermogravimetric (DTG) data of conventional SBA-15 and MS-ODSO.

FIG. 4 are plots of thermogravimetric (TG) and differential thermogravimetric (DTG) data of conventional SBA-15 and MS-ODSO synthesized in the presence of ODSO using a TGA Q500 instrument (TA Instruments). The TG data (upper curves in FIG. 4) are expressed as normalized percentage of mass change relative to temperature, and the DTG data (lower curves in FIG. 4) are expressed as mass % change relative to temperature.

The methods and compositions of the present invention have been described above and in the attached drawings; however, modifications will be apparent to those of ordinary skill in the art and the scope of protection for the invention is to be defined by the claims that follow.

The invention claimed is:

1. Mesoporous silica having hexagonal p6mm symmetry formed by the process of:
- mixing in an aqueous medium under conditions conducive to promote hydrolysis reactions effective quantities of
  - a surfactant as a soft template material to influence a silica mesoporous structure,
  - one or more water-soluble oxidized disulfide oil (ODSO) compounds as an acidity modifier, and
  - a silica source;
- heating the mixture under conditions and for a time effective conducive to promote condensation reactions and to form mesoporous silica as a precipitate suspended in a supernatant as an intermediate suspension; and
- recovering the mesoporous silica from the intermediate suspension.

2. The mesoporous silica as in claim 1, wherein the mixing comprises mixing in the aqueous medium the one or more water-soluble oxidized disulfide oil (ODSO) compounds and the surfactant to influence a silica mesoporous structure to form a first mixture, mixing the silica source with the first mixture under conditions conducive to promote hydrolysis reactions and form a second mixture, and wherein heating is of the second mixture.

3. The mesoporous silica as in claim 1, wherein the aqueous medium is an acidic aqueous medium comprising an acid component as an additional acidity modifier.

4. The mesoporous silica as in claim 1, further comprising treating the mesoporous silica to remove surfactant, wherein treating comprises solvent extraction or thermal treatment.

5. The mesoporous silica as in claim 1, wherein the hydrolysis reactions occur at a temperature in the range of about 20-65° C., condensation reactions occur at a temperature in the range of about 80-120° C., and wherein removing surfactant is by thermal treatment at a temperature in the range of about 215-600° C.

6. The mesoporous silica as in claim 1, wherein the ODSO compounds include 3 or more oxygen atoms.

7. The mesoporous silica as in claim 1, wherein the ODSO compounds having 1 to 20 carbon atoms.

8. The mesoporous silica as in claim 1, wherein the ODSO compounds have an average density greater than about 1.0 g/cc.

9. The mesoporous silica as in claim 1, wherein the ODSO compounds have an average boiling point greater than about 80° C.

10. The mesoporous silica as in claim 1, wherein the ODSO compounds are selected from the group consisting of (R—SOO—SO—R'), (R—SOO—SOO—R'), (R—SO—SOO—OH), (R—SOO—SOO—OH), (R—SO—SO—OH), (R—SOO—SO—OH), and mixtures thereof, where R and R' can be the same or different and are alkyl groups comprising 1-10 carbon atoms.

11. The mesoporous silica as in claim 1, wherein the silica source is selected from the group consisting of tetraethyl orthosilicate (TEOS), tetramethyl orthosilicate (TMOS), tetrapropyl orthosilicate (TPOS), tetrabutyl orthosilicate (TBOS) or sodium (meta)silicate.

12. The mesoporous silica as in claim 1, wherein the surfactant is a non-ionic surfactant.

13. The mesoporous silica as in claim 1, wherein the surfactant is a triblock copolymer of ethylene oxide/propylene oxide/ethylene oxide.

14. The mesoporous silica as in claim 4, wherein treating is by thermal treatment resulting in calcined mesoporous silica that possesses 0.1-65 percent more silanol groups, as a function of Q2 and Q3 silica, as compared to conventional SBA-15.

15. The mesoporous silica as in claim 14, wherein X-ray diffraction patterns show the tertiary 2 1 and 3 0 peak reflections that are more enhanced as compared conventional calcined SBA-15 mesoporous silica.

16. The mesoporous silica as in claim 1, that possesses an increased quantity of silanol groups, as a function of $Q^3$ and $Q^4$ silica, as compared to conventional uncalcined SBA-15.

17. The mesoporous silica as in claim 14, that possesses 25-65 percent more silanol groups as compared to conventional SBA-15.

18. The mesoporous silica as in claim 14, that possesses a 0.1-50 percent less $Q^4$ silica as compared to conventional SBA-15.

* * * * *